July 29, 1969 P. D. HENDERSON 3,457,836
DIGITALLY OPERATED ELECTROHYDRAULIC POWER SYSTEM
Filed May 29, 1967 2 Sheets-Sheet 2
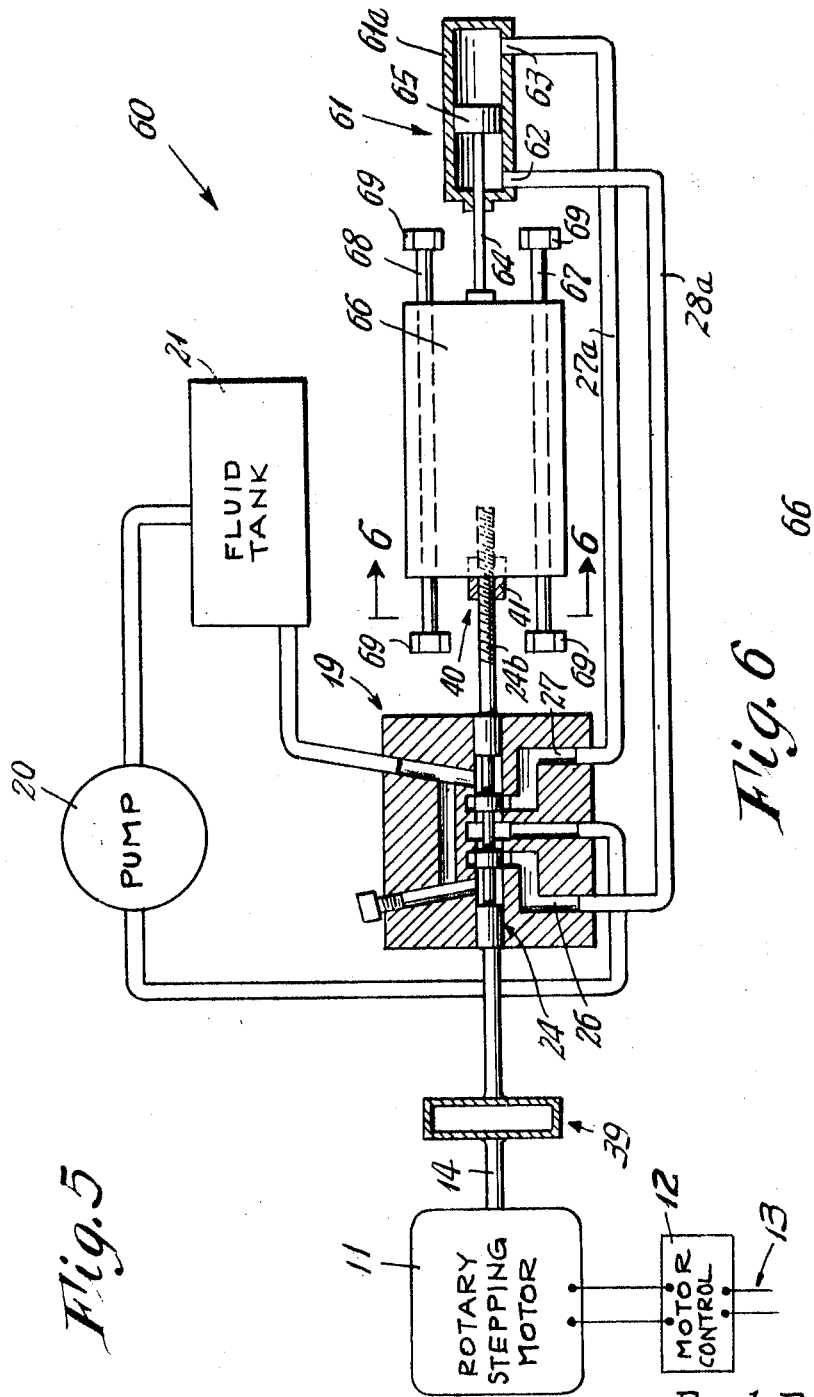
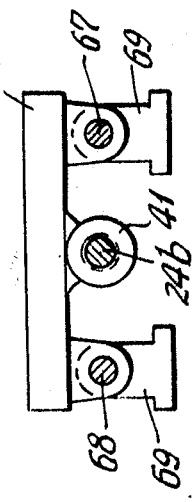
INVENTOR.
Paul D. Henderson
BY
Johnson and Kline
ATTORNEYS United States Patent Office 3,457,836
Patented July 29, 1969

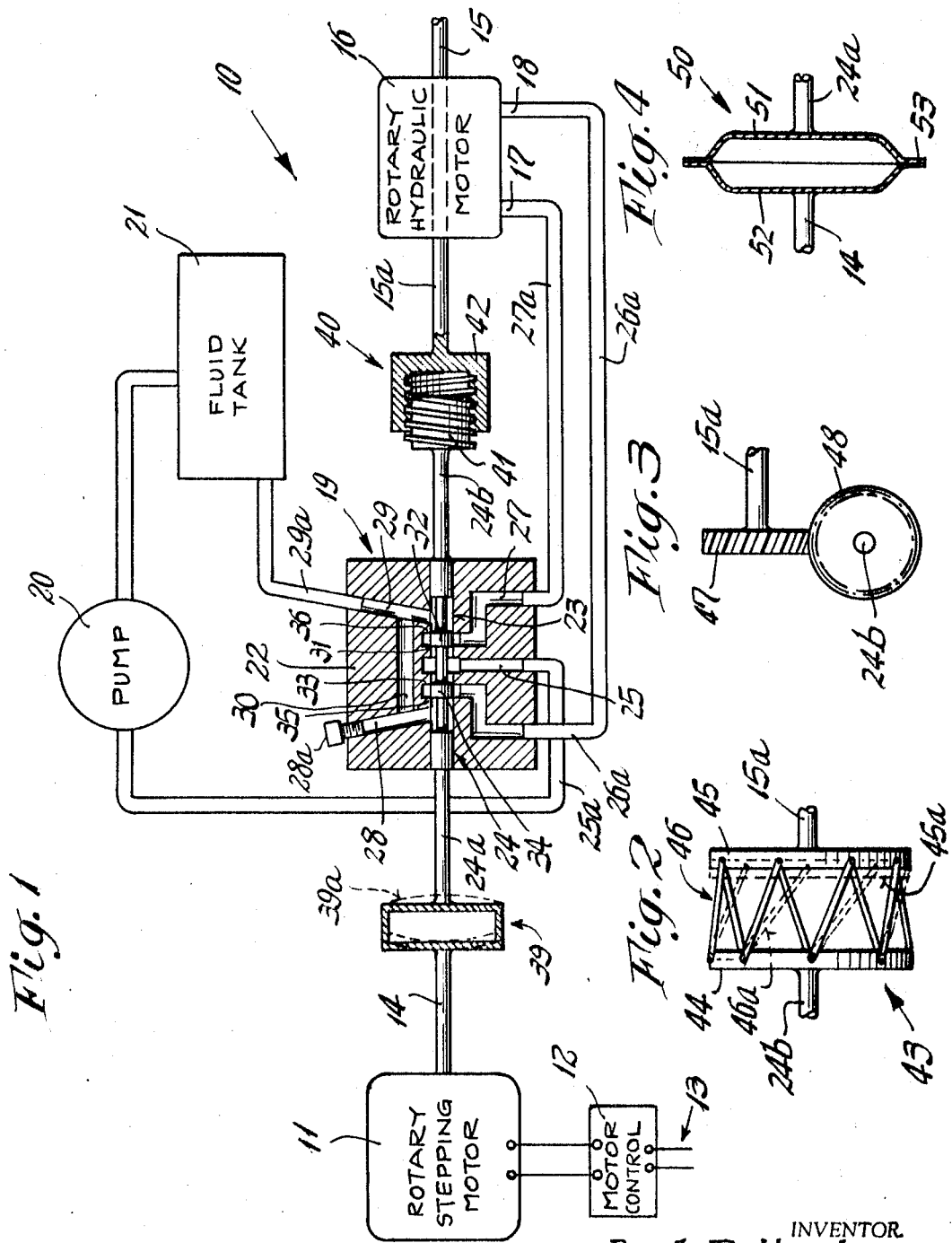

3,457,836
DIGITALLY OPERATED ELECTROHYDRAULIC POWER SYSTEM
Paul D. Henderson, Avon, Conn., assignor to The Superior Electric Company, Bristol, Conn., a corporation of Connecticut
Filed May 29, 1967, Ser. No. 642,082
Int. Cl. F15b 9/10, 13/044
U.S. Cl. 91—380                                    11 Claims

ABSTRACT OF THE DISCLOSURE

A system for having a digitally operated rotating stepping motor as the controlling mover and a hydraulic motor as the controlled output with the movement of the hydraulic motor being precisely controlled by both motors exerting linearly opposite movement to a linearly acting fluid controlling spool valve.

---

In U.S. Patent No. 3,117,268 there is described a control circuit for accepting electrical pulses and translating each pulse into a change of energization of a stepping motor. For each change of energization and hence each pulse accepted by the control circuit the motor rotates a small increment, on the order of 1.8°. Each step of the motor is quite precise and in view thereof has been found advantageously usable in mechanisms requiring accurate movement in response to digital electric information or commands. However, the stepping motor's capabilities are normally in the fractional horsepower range and thus it is prevented from use in many applications requiring higher power or torque.

It is accordingly an object of the present invention to provide an electric pulse operated system having a stepping motor and a hydraulic motor which has a higher torque output than the stepping motor without any substantial loss in accuracy and preciseness in responding to an electrical input command.

Another object of the present invention is to obtain the above object with a system that is extremely simple in construction, relatively economical to manufacture and durable in use.

In carrying out the present invention of a system that produces a small precise incremental movement of relatively high torque or power for each electric pulse supplied to it, there is provided a motor control for accepting the pulses. The control is interconnected to a rotary stepping motor to produce a change in energization of the motor to effect a small incremental rotational movement of the motor shaft. The output of the system in one embodiment shown herein is the shaft of a rotary hydraulic motor that has a pair of fluid ports. The hydraulic motor is of the positive displacement type and for movement in one direction, one port acts as the fluid input and the other the fluid exhaust while for the other direction they function reversely. The amount of movement of the shaft is directly related to the quantity of fluid passed through the motor and if both ports are closed, the shaft is maintained in a braked stationary condition. In another embodiment the hydraulic motor is also a positive displacement motor but produces a linear output with mechanical connections for enabling a rotary motion of the stepping motor to effect a linear movement.

The system further includes a hydraulic valve having a casing formed with a bore and a spool linearly or axially movable in the bore. Both the output of the stepping motor and the hydraulic motor are mechanically connected to opposite ends of the movable spool to effect its linear position in the bore. The casing is provided with fluid passages communicating with the bore, the ports of the hydraulic motor and a source of fluid under pressure and valving means are formed on the bore and the spool to control communication of the passages with the ports. The axial position of the spool determines if fluid is to flow and if it is to which port of the hydraulic motor.

The spool position in the bore is determined by the movement of the motors and as such will be located in the non-flowing fluid position only when the shafts of both motors have moved the same relative amount while a difference in the movement will displace the spool to the position which causes the hydraulic motor to be moved to overcome the difference. To this end, one system has mechanically connected between the spool and both motors a pair of transducers. One transducer is axially displaceable while being rotationally rigid and the other is a rotation-to-linear transducer. Thus the spool is caused not only to rotate with the motors but also to be axially movable in direct proportion to the difference in relative movement of the motors. In the other embodiment, using a linear hydraulic motor, an axial displaceable transducer and rotation-to-linear transducer are also utilized, with the latter transferring directly the linear movement of the hydraulic motor to the spool while enabling rotation of the stepping motor into a linear movement of the spool.

Other features and advantages will hereinafter appear.

In the drawing:

FIGURE 1 is a diagrammatic and pictorial representation of the components of the system of the present invention showing their interconnections.

FIGS. 2, 3 and 4 are embodiments of other transducers which may be used to interconnect the valve and motors.

FIG. 5 is a diagrammatic and pictorial illustration of a further embodiment of the present system utilizing a linear hydraulic motor.

FIG. 6 is a detail taken on the line 6—6 of FIG. 5.

Referring to the drawing, FIG. 1, one embodiment of the digitally operated electrohydraulic power system is generally indicated by the reference numeral 10 and includes a rotary stepping motor 11 which is energized by a motor control 12 having an input 13 on which pulses may be applied. The stepping motor 11 has a shaft 14 which is turned a small, incremental arc for each pulse supplied on the input 13 of the motor control 12 by the latter producing a change of energization to the windings of the motor 11. The motor may be incrementally rotated in either direction depending upon the manner in which the pulses are applied to the motor control. In the absence of a change of energization, the motor is inherently braked and maintained stationary. For a fuller description of the construction and operation of the motor 11 and control 12, reference is made to the above-noted patent which is assigned to the assignee of the present invention.

The power output of the system appears on a shaft 15 connected to a rotary hydraulic motor 16. The output is a rotary movement that is accurately related to the movement of the shaft 14 and in the specific embodiment shown, the movement is 1 to 1 and thus the movements are the same, though if desired other ratios may be used by altering the mechanical interconnections. The hydraulic motor 16 has a pair of ports 17 and 18 connected to a linear valve 19 for controlling the flow of fluid between the valve and the ports. For supplying fluid under pressure to operate the motor 16, the system includes a pump 20 communicating with a fluid supply tank 21 and the valve 19. With the port 17 communicating with the pump 20 and the port 18 communicating with the tank 21, both through the valve 19, the fluid flow will cause the shaft 15 to move in one direction while movement in the other direction is produced by the port 18 communicating with the pump 20 and the port 17 with the tank 21. With neither port 17 nor 18 communicating with the pump 20 or tank 21, the motor is held in a stationary braked position. As the hydraulic motor is of the positive displacement type, as for example a meshing gear type, the quantity of fluid flowing determines the amount of movement of the shaft 15.

The valve 19 includes a casing 22 that is formed with a through bore 23 which supports, for both rotational and axial or linear movement, a spool 24. A passage 25 communicates between the interior of the bore 23 through a conduit 25a to the output of the pump 20. Axially spaced from the passage 25 on either side thereof, also in communication with the bore, are passages 26 and 27 with the former being connected by a conduit 26a to the port 18 while the latter is connected by a condiut 27a to the port 17. Further passages 28 and 29 are in communication with the bore 23 and with themselves by a channel 30. One of the two passages 28 and 29 is closed by a stopper 28a while the other passage 29 is connected by a conduit 29a to the fluid supply tank 21.

The full line position of the spool in the bore shown is the intermediate position of the spool 24 and is in the position in which fluid flow through all passages is blocked by engagement between cooperating valving means on the spool and bore. The passage 25 is in constant communication with the bore and is blocked from the passage 27 by a valve seat 31 and cylindrical enlargement 32 on the spool 24. Similarly, the passage 26 is blocked from communication with passage 25 by engagement of a valve seat 33 and a cylindrical enlargement 34 on the spool 24. Both passages 26 and 27 are also prevented from communicating with the output passage 29 by reason of engagement of a valve seat 35 and spool enlargement 34 and a valve seat 36 and spool enlargement 32 respectively. Each of the valve seats is preferably formed as an integral inwardly projecting circular ridge while each of the valves consists of an integral externally projecting cylindrical enlargement of the spool with the latter being slidably movable within the former.

In operation of the valve, linear movement of the spool rightward from the intermediate position effects communication between the conduit 26a and the output passage 29 and the passage 25 and conduit 27a by the valving means 35 and 34 and 31 and 32 opening respectively with the other two valving means remaining closed. This produces rotation of the output 15, for example, in a clockwise direction. Similarly, for a movement leftwardly of the spool from the intermediate position, the valving means 36 and 32 will open effecting communication between the conduit 27a and the conduit 29a for exhausting the motor fluid, while fluid flow to the motor is effected through the passage 25, valving means 33 and 34 and conduit 26a.

The output motion of the stepping motor 11 is a rotary movement as is the output motion of the hydraulic motor 16. The spool rotates with the stepping motor but requires a linear movement for operation. To achieve these movements of the spool, there is connected between the output shaft 14 of the stepping motor and an end 24a of the spool, a transducer 39 which is axially resilient along the axis of the shaft 14 and spool 24 but is rotationally rigid in the sense that it will not permit the shaft 14 and spool 24 to move rotationally with respect to each other. It thus will transmit rotational movement without loss between the shaft 14 and the spool 24 while accommodating relative axial movement between them. Such a movement may be on the order of .0005 to .0020 inch for each step of the motor 11 which may be 1.8°.

The other end 24b of the spool is connected to an end 15a of the output shaft 15 through another transducer 40 which is employed to convert relative rotational movement into linear movement. In the particular embodiment shown in FIG. 1, this transducer 40 includes a threaded part 41 secured to the spool end 24b and a nut 42 secured to the end 15a. When both members 41 and 42 rotate together linear movement is not produced but if one moves rotationally with respect to the other, the rotational movement difference is translated into a linear movement with the linear movement being determined by the pitch of the threads. One pitch that has been found satisfactory is 5 to 1. It will moreover be understood that the transducer 40 is linear-to-linear rigid, that there is no loss of linear movement between the members and only a relative rotational difference will produce a linear movement.

In the operation of the system, without pulses being supplied to the motor controller 13, the valving means between the spool and the bore closes the passages between the valve and the hydraulic motor, both motors are held in a braked position and the spool is at its intermediate position. Upon a pulse being applied to the input 13, the stepping motor 11 will have a change of energization supplied thereto which causes its output shaft 14 to rotate through a small incremental arc. The transducer 39, the spool 24 and the threaded member 41 also will rotate therewith and the latter, by reason of its threaded cooperation with the nut 42 that is not now moving, effects a rightward linear movement of the spool. The linear movement is accommodated by a small axial bowing of the transducer 39, as exaggeratingly indicated by the dotted lines 39a. The rightward movement causes the spool 24 to open the valving means between the parts 31 and 32 and the parts 35 and 34 while maintaining closed valving means 32 and 36 and 33 and 34. Fluid will flow under pressure from the pump 20 through the passage 25, passage 27 and conduit 27a to the port 17 of the motor. Exhaust fluid from the motor is drained from the port 18 through conduit 26a, passages 26, 28, 30 and 29 and conduit 29a to the fluid tank 21.

As the hydraulic motor 16 is of the positive displacement type whose movement is directly related to the quantity of flow of fluid therein, the output shaft 15 will turn as the fluid flows and as it turns, the nut 42 will turn with respect to the threaded member 41 because the stepping motor is now held braked as there is now no change of energization thereto. Accordingly, the relative movement between the nut 42 and threaded member 41 is translated into a linear leftward movement of the spool. The valving means will remain open permitting fluid flow until a quantity of fluid has flowed through the motor 16 to cause the output shaft 15 to move the same rotational arc as the stepping motor shaft 14 initially moved when it received a change of energization. The spool 24 will then have been moved leftwardly to its intermediate position wherein all the valving means are closed.

Continued application of pulses on the input 13 results in the continual moving by the stepping motor of the spool to its open position while the hydraulic motor 15 continually attempts to maintain the spool in the closed intermediate position by its movement. Correspondence is thus achieved between the rotational movement made by the stepping motor output shaft 14 and the movement of the output 15 of the hydraulic motor by the spool serving to be opened whenever the output shaft 15 has not moved the same distance, for a 1 to 1 ratio, as the stepping motor 11.

The stepping motor 11 is preferably of the bidirectional type and it will be understood that a pulse on the output 13 which effects a step in the reverse direction will produce the same result except that the initial movement of the spool will be leftwardly, opening the port 18 to fluid from the pump 20 while draining port 17 into the tank. The hydraulic motor 16 will then rotate in the other direction.

While the transducer 39 and the transducer 40 have been described as being connected between the stepping motor and the spool and the hydraulic motor and the spool respectively, it will be understood that these may be reversed such that the transducer 40 may be positioned where transducer 39 is located and transducer 39 substituted in the place of transducer 40. In either system, one is located between each output shaft and the spool.

Shown in FIG. 2 is another construction of a transducer 43 which may be employed in place of the transducer 40 for translating relative rotary motion into a linear motion. The transducer 43 is shown connected to the shaft 15a and the end 24b of the spool valve. It consists of a pair of annular plates 44 and 45 each secured to their respective shaft and spool. A plurality of resilient wires 46 are secured on the periphery of the disk at an angle to the axes of the disks. If, for example, the spool 24 is rotated while the output shaft 15a is held against rotation, the angle of the wires 46 will change causing a relative lessening of the distance between the two plates. The front of the plate 45 will assume for example the dotted line position 45a while the wires will assume a position indicated by the dotted line 46a. For a reverse rotational movement, the plates will increase the distance therebetween.

Shown in FIG. 3 is a further structure of a transducer 40 for translating rotational movement into linear movement. In this embodiment, the hydraulic motor shaft 15a is connected to a helical gear 47 which mates with another helical gear 48 that is secured on the end 24b of the spool. The axes of rotation of the two gears are at right angles to each other and hence as one is held stationary, rotation of the other will cause the gear attached to the spool to slide on the other rather than produce rotation and hence effect the linear movement of the spool 24.

Shown in FIG. 4 is an example of a transducer 50 which may be employed in place of the transducer 39. In this embodiment two cup-shaped plates 51 and 52 are secured along their outwardly extending rims 53 as by welding or soldering with each plate being connected to the shaft 14 or the spool end 24a. The cup-shaped members are also herein axially flexible while the rims are rotationally rigid thereby enabling the transducer to absorb linear movement of the spool but yet not have any loss in rotational movement.

In the herein disclosed system, the force from the output 14 is substantially unrelated to the power of the stepping motor 11 as it is primarily a function of the pressure of the fluid produced by the pump 20. The valve, by having an intermediate closed position and displaceable in either direction therefrom, tends to balance the forces created by the pressure. Thus the system only requires a relatively small torque stepping motor to control a much larger output force.

Shown in FIG. 5 is a further embodiment of another system of the present invention which is generally indicated by the reference numeral 60 and in which the output movement of the hydraulic motor consists of a linear movement rather than a rotational movement. In the system 60, the motor control 12, stepping motor 11, transducers 39 and 40, valve 19, pump 20, fluid tank 21 and the associated conduits are identical in construction to the previously disclosed embodiment and have been given the same reference character. A linear hydraulic motor 61 has a closed cylinder 61a with a port 62 and 63 at each end thereof connected to the conduits 27a and 28a. A piston rod 64 is connected to a piston 65 with the piston being movable within the cylinder and the rod extending from an end thereof. The rod 64 is secured to a worktable 66 that is mounted for linear movement on a pair of shafts 67 and 68 whose ends may be supported by bases 69 with the table only moving in a direction aligned with the direction of movement of the rod 64. The other end of the table 66 opposite to its connection to the piston rod 64 has the nut 41 secured thereto through which passes the end 24b of the spool. The end 24b is threaded for a length which is larger than in the previously disclosed system and which preferably corresponds to the extent of movement of the piston 64 and hence table 66 and threadingly cooperates with the nut 41 in the same manner as in the transducer 40. It will be understood that the nut 41 is made fast to the table 66 and hence can only move in alignment with the piston and also that such movement is along the axis of the bore of the valve.

In the operation of the system 60, the stepping motor 11 receives a change of energization, rotates a small increment and causes the spool 24 to rotate in the nut 41 and move, for example, rightwardly to open the conduit 27 to fluid flow from the pump while exhausting the conduit 28a. Fluid flows into the port 63 of the linear hydraulic motor 61 advancing the piston leftwardly. It will be appreciated that the table 66 has not initially moved and thus the relationship between the spool end 24b and the nut 41 will be similar to that previously disclosed, the translation of a relative rotational movement into a linear movement of the spool. With fluid flow, the piston 65 will be moved leftwardly and as it moves, the nut 41 will also move linearly therewith but without rotational movement. The movement of the nut 41 linearly moves the spool 24 a distance which effects its closing as it will remain open until sufficient fluid has passed into the motor 61 to effect the required linear motion.

As in the other embodiment the rotary stepping motor 11 may operate in either direction and thus the piston 65 may move the table in the direction dictated by the stepping motor direction. Morever, in the system 60 shown, the movement of the table is dictated by the pitch of the threads of transducer 40 and may be a 1 to 1 ratio with the linear movement produced by the stepping motor 11.

It will accordingly be appreciated that there has been disclosed a digitally operated electrohydraulic system that produces a precise and accurate movement of relatively high power for each pulse supplied to the system with the movement being either rotational or linear. Initially the pulse command is converted into a rotational movement related to the output movement desired by a stepping motor and this movement rotates a spool of a linear valve that is connected to control the flow of fluid to the hydraulic motor which produces the output movement. The lack of output movement of the hydraulic motor causes the rotational movement of the stepping motor to also effect a linear movement of the spool, thereby permitting fluid flow to the hydraulic motor and its consequent movement. The output movement in turn will effect a reverse linear movement of the spool to cause it to close when the output has produced the same motion as caused by the stepping motor to thereby cease further movement.

The utilization in the system of a linearly moving spool valve has been found to provide accurate control of fluid flow for small displacement of the spool from its intermediate, closed position where it normally operates thereby enabling the system to function accurately and precisely. At small spool movements, the fluid flow has been found to be substantially linear with respect to the degree of displacement of the spool even though and perhaps as a result of the spool being also rotated relative to the remainder of the valve during its operation.

I claim:

1. A digitally operated electrohydraulic power system comprising a stepping motor having an output for producing a small incremental rotational movement for each change of energization supplied thereto, motor control means for receiving an electric pulse and providing a change of energization to the motor, a hydraulic motor having an output and a first and a second port with said first port being the fluid input for movement in one direction and said second port being the fluid input for movement in the other direction, valve means including a stationary casing have a bore and a spool mounted for axial linear movement in said bore, passage means formed in said valve communicating between said bore and said hydraulic motor ports and a source of fluid under pressure, said spool and said bore having cooperating valving means for closing both of said motor ports at the intermediate position of said spool in said bore, and for interconnecting the source and the first port for a first linearly displaced position of the spool from the intermediate position and for interconnecting the source and the second port for second linearly displaced position of the spool in the other direction from the intermediate position, means interconnecting the spool, the stepping motor output and the hydraulic motor output for providing a linear movement of the spool away from its intermediate position upon one of the motors moving without the other and a reverse linear movement of the spool for the other motor without the first moving and for positioning the spool at the intermediate position when both motors have moved a relatively corresponding distance and in which the interconnecting means includes one axially resilient but rotationally rigid transducer connected between one motor and the spool and one rotation-to-linear transducer connected between the other motor and the spool, with one of said transducers being located on one side of said casing and the other transducer on the opposite side of said casing.

2. The invention as defined in claim 1 in which the means connecting both transducers to the spool connects the transducers in axial alignment with the spool.

3. The invention as defined in claim 3 in which the axially resilient but rotationally rigid transducer is connected between the stepping motor output and the spool.

4. The invention as defined in claim 1 in which the axially resilient but rotationally rigid transducer includes a coupling having flexible side walls and a rigid periphery.

5. The invention as defined in claim 1 in which the rotation-to-linear transducer includes a pair of circular plates and a plurality of resilient means extending between the peripheries of the plate at an angle to the axis of the transducer.

6. The invention as defined in claim 2 in which the rotation-to-linear transducer includes a pair of helical gears having transversely disposed axis.

7. The invention as defined in claim 2 in which the rotation-to-linear transducer includes a pair of cooperating threaded members, one of said members being connected to the spool and the other member connected to the hydraulic motor output.

8. The invention as defined in claim 1 in which the system includes an exhaust tank for the fluid, the valve includes drain passages communicating between the first and second ports, valving means formed between the bore and spool in said passages, said valving means closing said drain passages at the intermediate position of the spool for interconnecting the second port to the drain passage at the first position of the spool and for interconnecting the first port to the drain passage at the second position of the spool.

9. The invention as defined in claim 8 in which the hydraulic motor is a positive displacement and produces a rotational output directly related to the quantity of fluid flowing between the two ports.

10. The invention as defined in claim 8 in which the hydraulic motor produces linear motion and includes a cylinder and piston with a port being adjacent each end of the cylinder and means connecting the piston through the rotation-to-linear transducer to transmit linear movement of the piston to the spool.

11. The invention as defined in claim 10 in which the last-named means includes a worktable, means mounting the worktable for a linear movement aligned with the linear movement of the piston and in which the rotation-to-linear transducer includes a threaded member connected to the spool and a cooperating threaded member secured to the table.

References Cited

UNITED STATES PATENTS

| 3,072,422 | 1/1963 | Armstrong | 285—229 |
| 3,107,931 | 10/1963 | Killian | 285—229 |
| 3,211,475 | 10/1965 | Freed | 285—229 |
| 2,960,071 | 11/1960 | Rosebrook | 91—380 |
| 3,103,148 | 9/1963 | Brusque | 91—380 |
| 3,310,284 | 3/1967 | Inaba et al. | 91—380 |
| 3,318,197 | 5/1967 | McNamee | 91—380 |

CARROLL B. DORITY, JR., Primary Examiner

U.S. Cl. X.R.

91—368, 459